(12) United States Patent
Wang

(10) Patent No.: US 7,275,381 B2
(45) Date of Patent: Oct. 2, 2007

(54) LIGHT DEVICE FOR REFRIGERATOR OR FREEZER

(76) Inventor: Hung-Hsiang Wang, No. 3, Alley1, Lane 454, Jhongjheng Rd., Wuci Township, Taichung County 435 (TW)

( * ) Notice: Subject to any disclaimer, the term of this patent is extended or adjusted under 35 U.S.C. 154(b) by 281 days.

(21) Appl. No.: 11/180,663

(22) Filed: Jul. 14, 2005

(65) Prior Publication Data

US 2006/0023456 A1     Feb. 2, 2006

(30) Foreign Application Priority Data

Jul. 28, 2004    (CN) .................. 2004 2 0029411

(51) Int. Cl.
*F25B 5/00*    (2006.01)
*G05F 1/00*    (2006.01)

(52) U.S. Cl. .................. 62/200; 62/190; 315/309; 315/307; 315/312

(58) Field of Classification Search .................. 62/200, 62/202, 203, 513–519, 159–164, 213–215, 62/3.7, 50.6, 623, 628, 132, 207, 208; 315/309, 315/307, 297, 312, 323
See application file for complete search history.

(56) References Cited

U.S. PATENT DOCUMENTS 5,768,898 A * 6/1998 Seok et al. .................. 62/132
6,330,803 B1 * 12/2001 Shin .......................... 62/156

* cited by examiner

*Primary Examiner*—Tuyet Vo
(74) *Attorney, Agent, or Firm*—Rosenberg, Klein & Lee

(57) ABSTRACT

A light device for refrigerators or freezers includes a sensor, a first manual switch, a rotatable switch, an interior loop and an alternative current power supply. The interior loop includes an interior circuit, an exterior circuit and a control loop. The alternative current power supply is connected to the rotatable switch which is electrically connected the first manual switch and the control loop via the interior circuit. The control loop is electrically connected to a magnetic device and electrically connected to the interior circuit in series. The interior circuit and the exterior circuit are electrically connected in parallel and then both are connected to an earth end of the alternative current power supply. The refrigerator is equipped with functions of automatic light controlled and anti-theft.

3 Claims, 4 Drawing Sheets

LIGHT DEVICE FOR REFRIGERATOR OR FREEZER

FIELD OF THE INVENTION

The present invention relates to a light device for refrigerators or freezers, and includes a sensor for detection of temperature change to control the activation of the light to save energy.

BACKGROUND OF THE INVENTION

A conventional light device for refrigerators or freezers is shown in FIG. 4 and generally includes a rotatable switch 6, an interior light 61 and an exterior light 62 which is electrically connected to the interior light 61 in parallel. The switch 6 is a two-stage operation switch so as to respectively control the interior light 61 and the exterior light 62. The switch 6 is manually rotated to the first stage of rotation to let the exterior light 62 light up and then the interior light 61 is lighted up by continuously rotating the switch 6 to second stage of operation. By this way, the products in the freezer can be seen by the customers and the exterior light 62 provides a bright shopping mood. However, the interior and exterior light 61, 62 does not automatically turn off when no customers to visit the freezer and electrical power is wasted during the period.

SUMMARY OF THE INVENTION

The primary object of the present invention is to provide a light device for refrigerator or freezer and employs a sensor to detect any temperature change and then sends a signal to a controller to control the interior and/or exterior lights so as to save energy.

Another object of the present invention is to provide a light device for refrigerator or freezer and employs a sensor to detect any temperature change and then sends a signal to activate a red warning light and a sound generating device to avoid theft.

The present invention relates to a light device for refrigerator or freezer, and comprises a sensor, a first manual switch, a rotatable switch, an interior loop and an alternative current power supply. The interior loop includes an interior circuit, an exterior circuit and a control loop. The alternative current power supply is connected to the rotatable switch which is electrically connected the first manual switch and the control loop via the interior circuit. The control loop includes a first electromagnetic valve and is electrically connected to the interior circuit in series. The interior circuit and the exterior circuit are electrically connected in parallel and connected to an earth end of the alternative current power supply.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
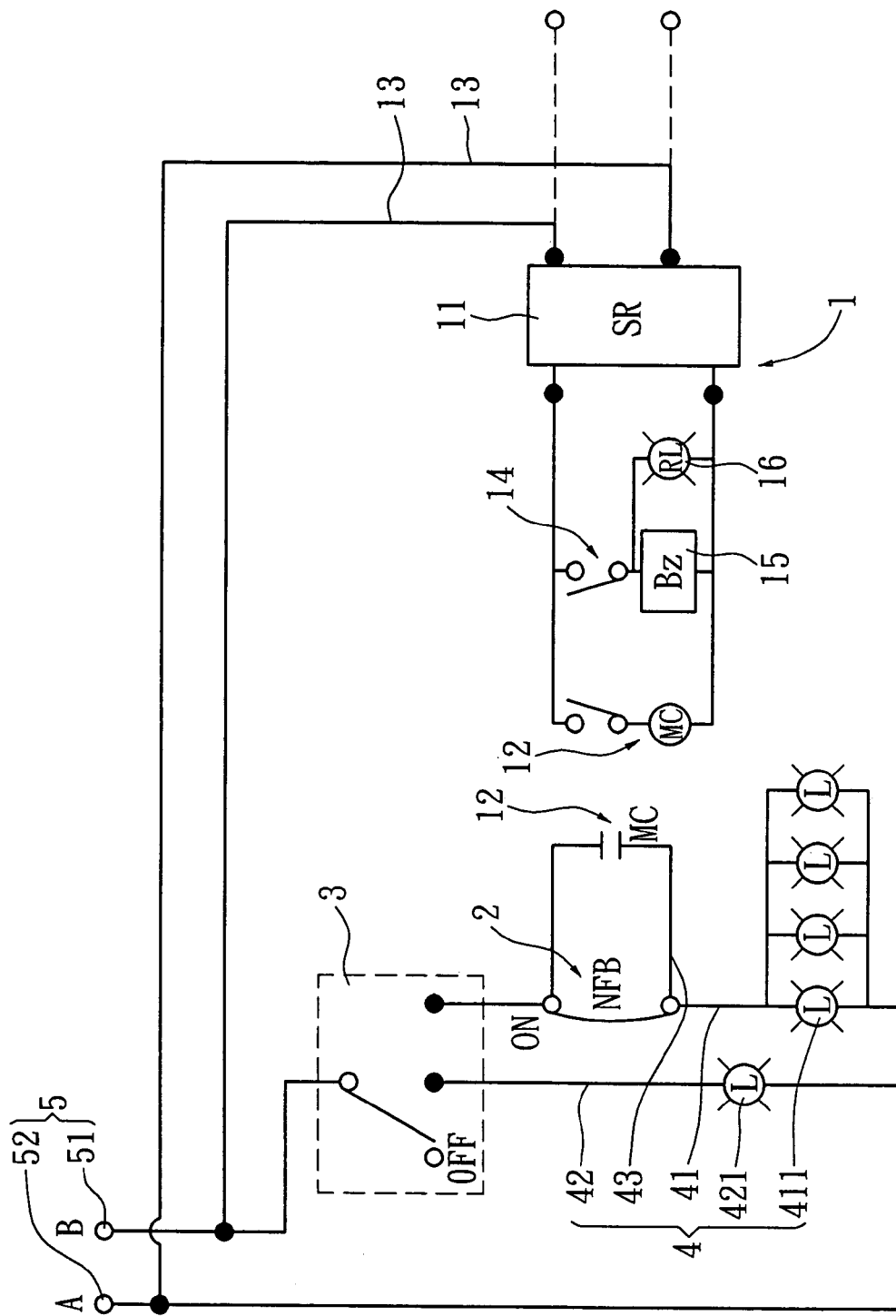
FIG. 1 is a circuit diagram of the present invention.

Referring to FIG. 1, the light device for refrigerators or freezers comprises a sensor 1, a first manual switch 2, a rotatable switch 3, an interior loop 4 and an alternative current power supply 5. The sensor 1 is connected between the interior loop 4 and the alternative current power supply 5. In this embodiment, the sensor 1 includes a controller 12, a heat sensor 11, an auxiliary loop 13, a second manual switch 14, a sound generating device 15 and a red warning light 16. In the auxiliary circuit 13, the controller 12, the sound generating device 15 and the red warning light 16 are connected in parallel. The controller 12 is a magnetic device and the sound generating device 15 and the red warning light 16 are controlled by the second manual switch 14. The first manual switch 2 is a no-fuse switch and includes a serge protection device, and the second manual switch 14 is a mono switch. The interior loop 4 includes an interior circuit 41, an exterior circuit 42 and a control loop 43. The function end 51 of the alternative current power supply 5 is connected to the rotatable switch 3 which is electrically connected to the interior circuit 41 and the exterior circuit 42 via the interior loop 4. The interior circuit 41 is electrically connected to the first manual switch 2 which is located at the cross point of the interior circuit 41 and the control loop 43 which is electrically connected to the other contact point of the magnetic device and electrically connected to the interior circuit 41 in series. The interior circuit 41 and the exterior circuit 42 are electrically connected in parallel and connected to an earth end 52 of the alternative current power supply 5.

As shown in FIG. 1, the operator manually rotates the rotatable switch 3 which is a two-stage switch, the first stage activates the exterior circuit 42 so that the light 421 outside the freezer lights up. The second stage activates the interior circuit 41 to allow the interior light 411 lights up. The interior circuit 41 can be controlled by the first manual switch 2 to control the interior light 411.

Figure 2:
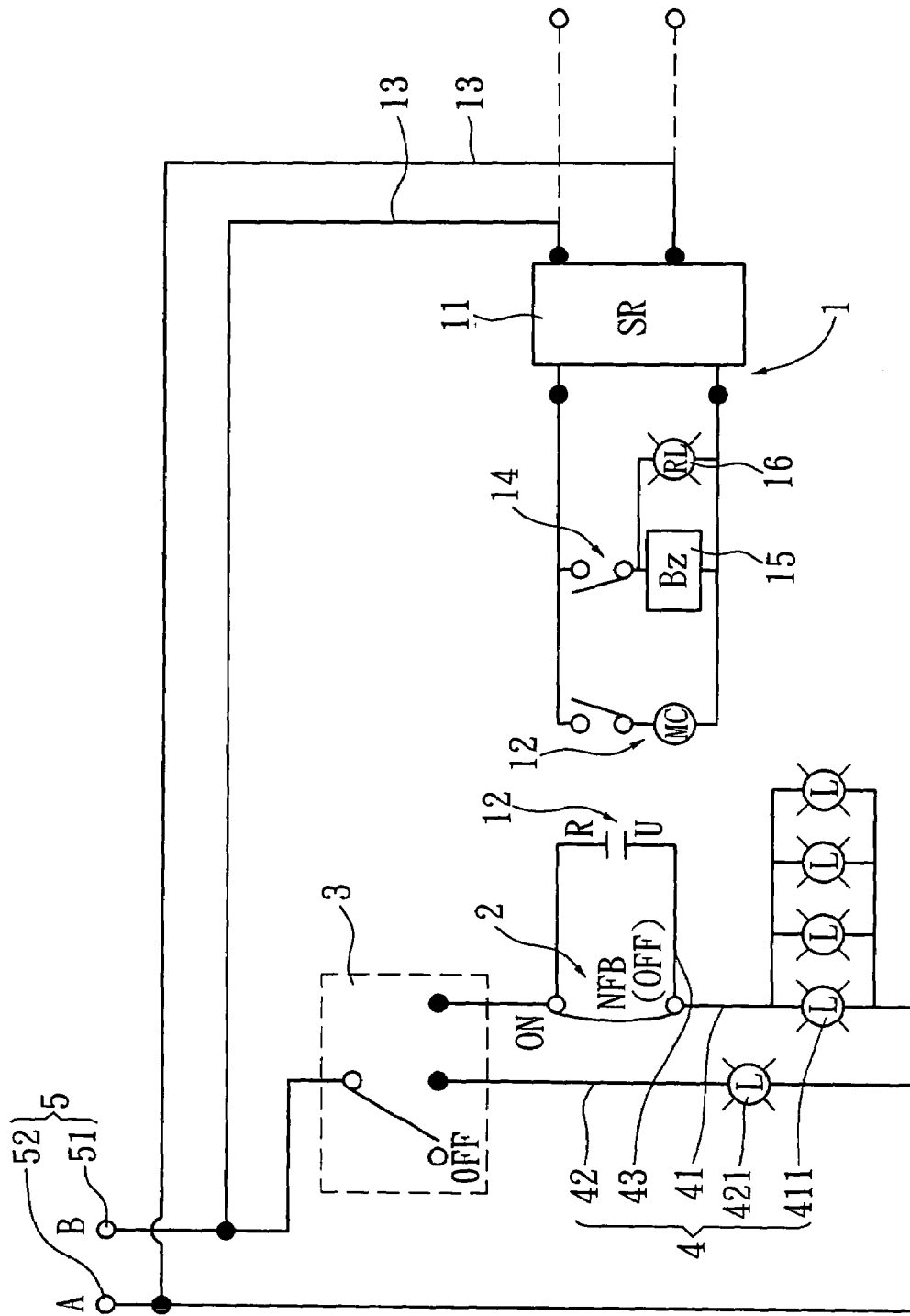
FIG. 2 shows another embodiment of the circuit diagram of the present invention.

As shown in FIG. 2, in order to save energy, the second manual switch 2 is turned off and the auxiliary loop 13 provides electric power to the heat sensor 11 and the interior light 411 is controlled by the control loop 43. When customers approach the freezer, the heat sensor 11 detects the temperature change and informs the controller 12 to activate the magnetic device to connect the contact points "R" and "U" to activate the interior light 411. On the contrary, when the customers leave, the heat sensor 11 counts, if the customers do not buy the products in the pre-set period of time and the heat sensor 11 does not sense temperature change, the power is cut and informs the controller 12 so that the two contact points "R" and "U" cannot contact with each other and the interior circuit 41 is in an open status and the interior light 411 is off so as to save the energy.

Figure 3:
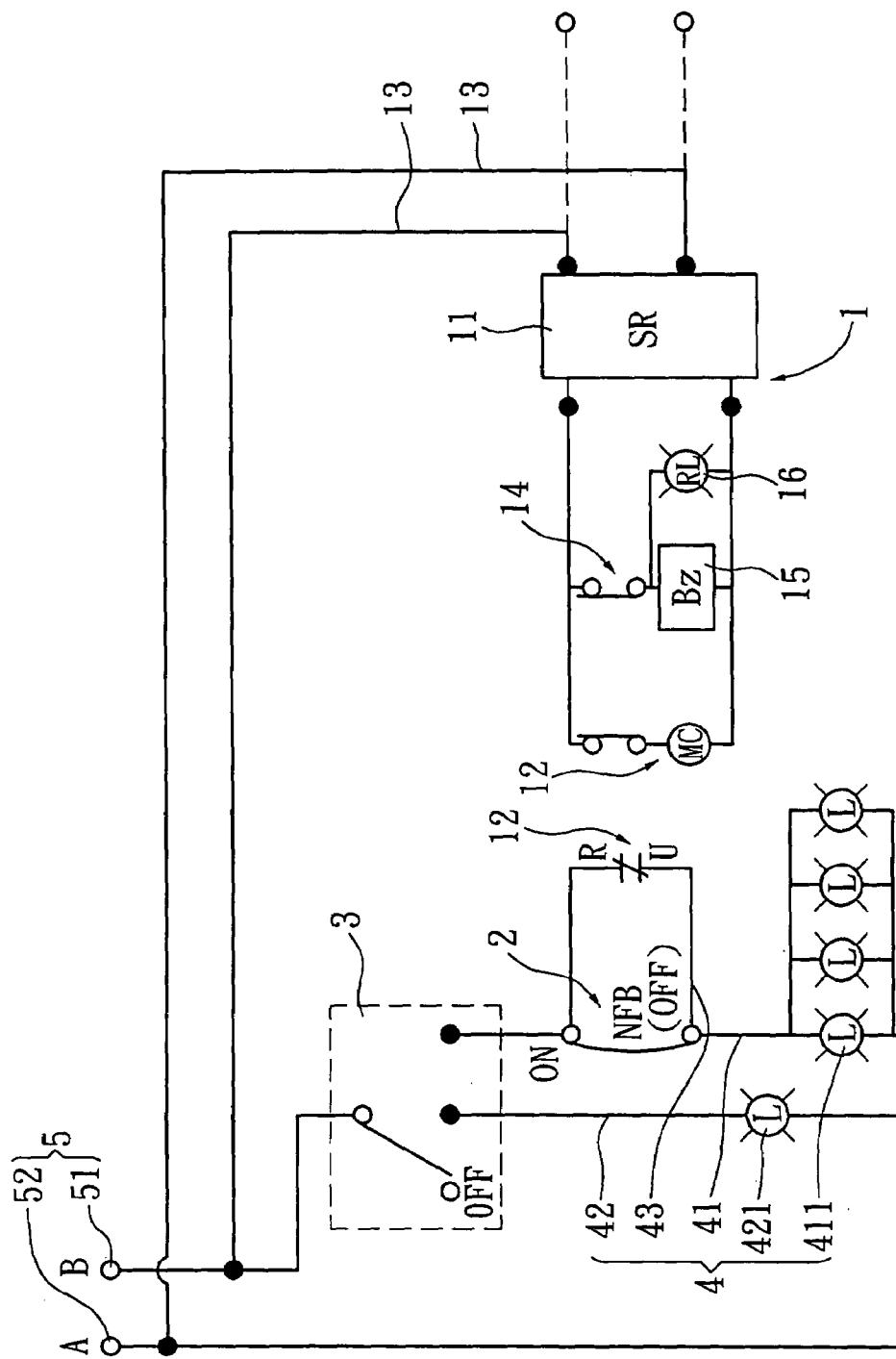
FIG. 3 shows yet another embodiment of the circuit diagram of the present invention.
Figure 4:
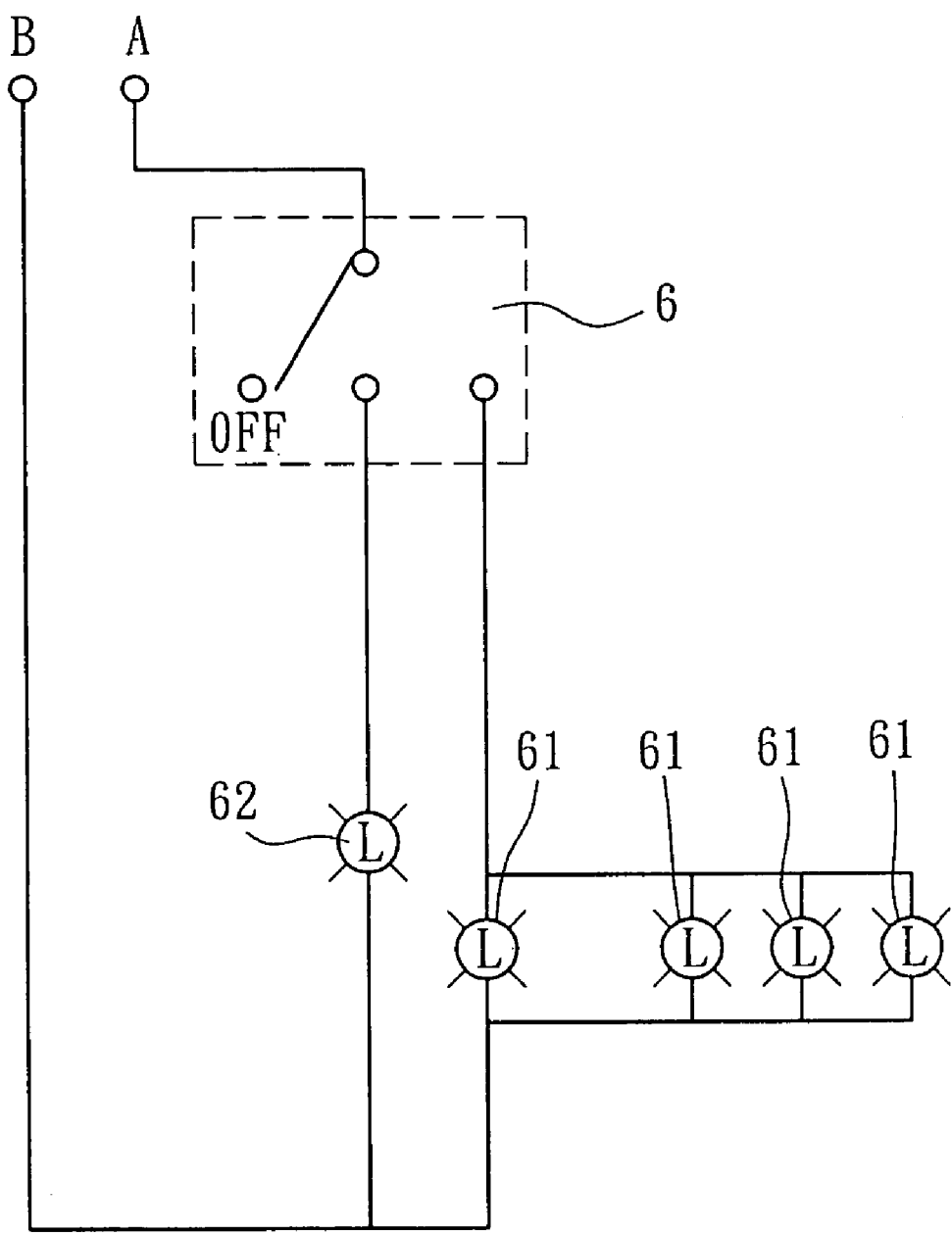
FIG. 4 shows a conventional circuit.

When the store is closed, the first manual switch 2 and the rotatable switch 3 are turned off and the second manual switch 14 is turned on, as shown in FIG. 3. If an unauthorized person approaches the freezer, the heat sensor 11 detects the temperature change and activates the sound generating device 15 via the auxiliary loop 13 to generate sound and the read warning light 16 lights up so as to have an anti-theft function.

The heat sensor 11 may also be connected to another power supply as shown by dotted lines.

While we have shown and described the embodiment in accordance with the present invention, it should be clear to those skilled in the art that further embodiments may be made without departing from the scope of the present invention.

What is claimed is:

1. A light device for refrigerators or freezers, comprising: a sensor, a first manual switch, a rotatable switch, an interior loop and an alternative current power supply, the first manual switch being a no-fuse switch and including a serge protection device, the interior loop including an interior circuit, an exterior circuit and a control loop, the sensor connected between the interior loop and the alternative current power supply, the alternative current power supply connected to the rotatable switch which is electrically connected the first manual switch and the control loop via the interior circuit, the interior circuit electrically connected to the control loop which is electrically connected to the interior circuit in series, the interior circuit and the exterior circuit being electrically connected in parallel and connected to an earth end of the alternative current power supply.

2. The device as claimed in claim 1, wherein the sensor includes a controller, a heat sensor, an auxiliary loop, a second manual switch, a sound generating device and a red warning light.

3. The device as claimed in claim 1, wherein the first manual switch is located at the cross point of the interior circuit and the control loop which is electrically connected to a magnetic device and electrically connected to the interior circuit in series.

* * * * *